United States Patent
Clark et al.

(10) Patent No.: US 10,692,155 B2
(45) Date of Patent: Jun. 23, 2020

(54) VIRTUAL BUDGETING COMPUTER PROGRAM PRODUCT, SYSTEM AND METHOD

(71) Applicants: Ryan Clark, Pleasant Grove, UT (US); Richard Holden, Pleasant Grove, UT (US)

(72) Inventors: Ryan Clark, Pleasant Grove, UT (US); Richard Holden, Pleasant Grove, UT (US)

(73) Assignee: ProActive FinTech LLC, Pleasant Grove, UT (US)

(*) Notice: Subject to any disclaimer, the term of this patent is extended or adjusted under 35 U.S.C. 154(b) by 0 days.

(21) Appl. No.: 15/267,036

(22) Filed: Sep. 15, 2016

(65) Prior Publication Data
US 2017/0076398 A1  Mar. 16, 2017

Related U.S. Application Data

(60) Provisional application No. 62/219,065, filed on Sep. 15, 2015.

(51) Int. Cl.
*G06Q 20/34* (2012.01)
*G06Q 40/00* (2012.01)
*G06Q 20/10* (2012.01)

(52) U.S. Cl.
CPC ............ *G06Q 40/12* (2013.12); *G06Q 20/10* (2013.01); *G06Q 20/34* (2013.01)

(58) Field of Classification Search
CPC ....... G06Q 40/02; G06Q 40/12; G06Q 20/405
See application file for complete search history.

(56) References Cited

U.S. PATENT DOCUMENTS

| | | | | |
|---|---|---|---|---|
| 7,707,105 B2* | 4/2010 | O'Neil | ............ | G06Q 20/10 705/35 |
| 8,341,084 B2* | 12/2012 | Cowen | ............ | G06Q 20/105 235/379 |
| 8,600,882 B2* | 12/2013 | Summerrow | ....... | G06Q 20/28 705/35 |
| 8,768,801 B1* | 7/2014 | Cheatham | ......... | G06Q 40/00 705/30 |
| 9,495,703 B1* | 11/2016 | Kaye, III | ........... | G06Q 40/00 |
| 9,589,266 B2* | 3/2017 | Pourfallah | ......... | G06Q 20/3276 |
| 2001/0047336 A1* | 11/2001 | Maycock, Jr. | ...... | G06Q 20/04 705/44 |
| 2014/0089191 A1* | 3/2014 | Brown | .......... | G06Q 20/12 705/44 |
| 2016/0063494 A1* | 3/2016 | Madduri | .......... | G06Q 20/405 705/16 |
| 2016/0321663 A1* | 11/2016 | Batlle | ............ | G06Q 20/409 |
| 2016/0342992 A1* | 11/2016 | Lee | ............... | G06Q 30/06 |
| 2017/0200158 A1* | 7/2017 | Honey | ............. | G06Q 20/40 |

* cited by examiner

*Primary Examiner* — Joshua T Kennedy
(74) *Attorney, Agent, or Firm* — Matthew D. Thayne; Thayne and Davis LLC

(57) ABSTRACT

A system, method and computer program product are disclosed for imposing budget control constraints on user financial resources, including allocating funds across a plurality of sub-accounts exclusively associated with categories, the categories associated with a type of expenditure. A predetermined spending threshold is set for each category and a credit card may be activated in response to a spending threshold exceeding a requested payment.

13 Claims, 13 Drawing Sheets

VIRTUAL BUDGETING COMPUTER PROGRAM PRODUCT, SYSTEM AND METHOD

BACKGROUND OF THE INVENTION

Field of the Invention

This invention relates generally to computer applications (also known as "apps") for budgeting financial resources, and more particularly relates to a system, method and web-based application for allocating financial resources across various categories and authorizing expenditures failing to exceed a predetermined threshold.

Description of the Related Art

There exist many computer program products in the art for retrospective allocation of expenditures already made into predetermined categories, including programs such as QuickBooks, Excel, and Quicken; but no efficient computer program products for allocating expenditures into predetermined categories before the expenditure is made, much less of authorizing the expenditure only in response to a predetermined spending threshold failing to be exceeded for the category into which the expense falls.

In today's world of electronic commerce, shoppers are barraged with print, ads, cost per click ads, billboards, and opportunities to spend discretionary income. Many individuals, businesses, spouses, travelers, and even municipalities overspend without regard as to what type of expenditure is being made until after the expense is paid. These individuals and organization has no access to efficient means in the art of categorizing and pre-authorizing expenditures before they are paid. Most budgeting systems fail because they try and control, or account for, expenditures after they have been made rather than before. Further the time-tested cash budgeting methods of the past are becoming obsolete because our society is becoming cashless.

A system, method and computer program product are needed for imposing budget control constraints on users' financial resources, including allocating funds or credit across a plurality of categories associated with a type of expense, setting predetermined spending thresholds for each category, then categorizing/itemizing expenses into one of the plurality of categories and approving only expenses falling below the predetermined spending threshold.

SUMMARY OF THE INVENTION

From the foregoing discussion, it should be apparent that a need exists for a virtual budgeting computer program product. The present invention has been developed in response to the problems and needs in the art that have not yet been fully solved by currently available apparati and methods. Accordingly, the present invention has been developed to provide a computer program product in computer readable memory for controlling related expenditures collectively exceeding a predetermined threshold, the operations of the computer program product comprising: setting a predetermined spending threshold for each of a plurality of categories, each of the plurality of spending thresholds exclusively associated with a category, each of the plurality of spending thresholds comprising an integer indicative of a dollar amount; accepting from a user a fund transfer request comprising: an integer indicative of an amount of an intended purchase; and a category in which to categorize the intended purchase; reducing the spending threshold exclusively associated the category by the integer indicative of an amount of an intended purchase; temporarily allocating funds from a general account to a category account exclusively associated with the category in response to the spending threshold exceeding zero; and activating a credit card under the control of the user in response to the temporarily allocation of funds.

The computer program product may further comprise: automatically reallocating the funds from the category account to the general account after expiration a predetermined term; and deactivating a credit card under the control of the user in response to the automatic reallocation of funds.

The computer program product may further comprise activating a credit card under the control of the user in response to a geostatic location of the user coinciding with a geostatic location of an approved merchant through reference to an approved merchant list.

The predetermined term may be one hour. The user may define a number of the plurality of categories and a name for each of the plurality of categories. The computer program product may further comprise: aggregating the fund transfer request with previously authorized payments over a predefined interval within the category to produce a category sum; relaying the aggregating category sum to the user; and displaying the category sums for each category on a portable GUI.

The fund transfer request may comprise a user name and an account number. A computer-implemented method for controlling related expenditures exceeding a predetermined threshold is also provided, the steps of the method comprising: setting a predetermined spending threshold for each of a plurality of categories, each spending threshold exclusively associated with a category, each spending threshold consisting of an integer; wherein a sum of all predetermined spending thresholds is less than the a dollar balance in the general account; virtually allocating transaction funds from the balance to a virtual account exclusively associated with a category in response to receiving a fund transfer request from a user; virtually reallocating the transaction funds from the virtual account to the balance after expiration of a predetermined time without a change in an amount of funds allocated the virtual account; electronically activating a credit card under the control of a user in response to the amount of funds exceeding the payment authorization request.

The predetermined term may be less than one hour. A user may define a name for each of the plurality of categories. The authorization request may comprise a virtual account number exclusively associated with the virtual account.

The computer-implemented method may further comprise: automatically reallocating the funds from the category account to the general account after expiration a predetermined term; and deactivating a credit card under the control of the user in response to the automatic reallocation of funds.

The computer-implemented method may further comprise activating a credit card under the control of the user in response to a geostatic location of the user coinciding with a geostatic location of an approved merchant through reference to an approved merchant list.

A system for controlling expenditures exceeding a predetermined threshold is also provided, the modules comprising: one or more processors; a computer readable memory accessible via a signal bearing medium by the one or more processors, the computer readable memory storing programming instructions; an allocator module configured to allocate funds across a plurality of virtual accounts; a setter module configured to set a predetermined spending threshold for each of a plurality of categories, each spending threshold exclusively associated with a category, each of the plurality of categories exclusively associated with one of the plurality of virtual accounts; a receiver module configured to electronically receive a payment authorization request comprising a requested payment amount; a categorizer module configured to categorize the authorization request into one of the plurality of categories; and an authorization module configured to deactivate a credit card in response to the requested payment amount exceeding a spending threshold for the categorized authorization request.

The authorization module may be further configured to deactivate a credit card in response to a merchant geolocated at geostatic location of the user failing to be listed in an approved merchant list.

These features and advantages of the present invention will become more fully apparent from the following description and appended claims, or may be learned by the practice of the invention as set forth hereinafter

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
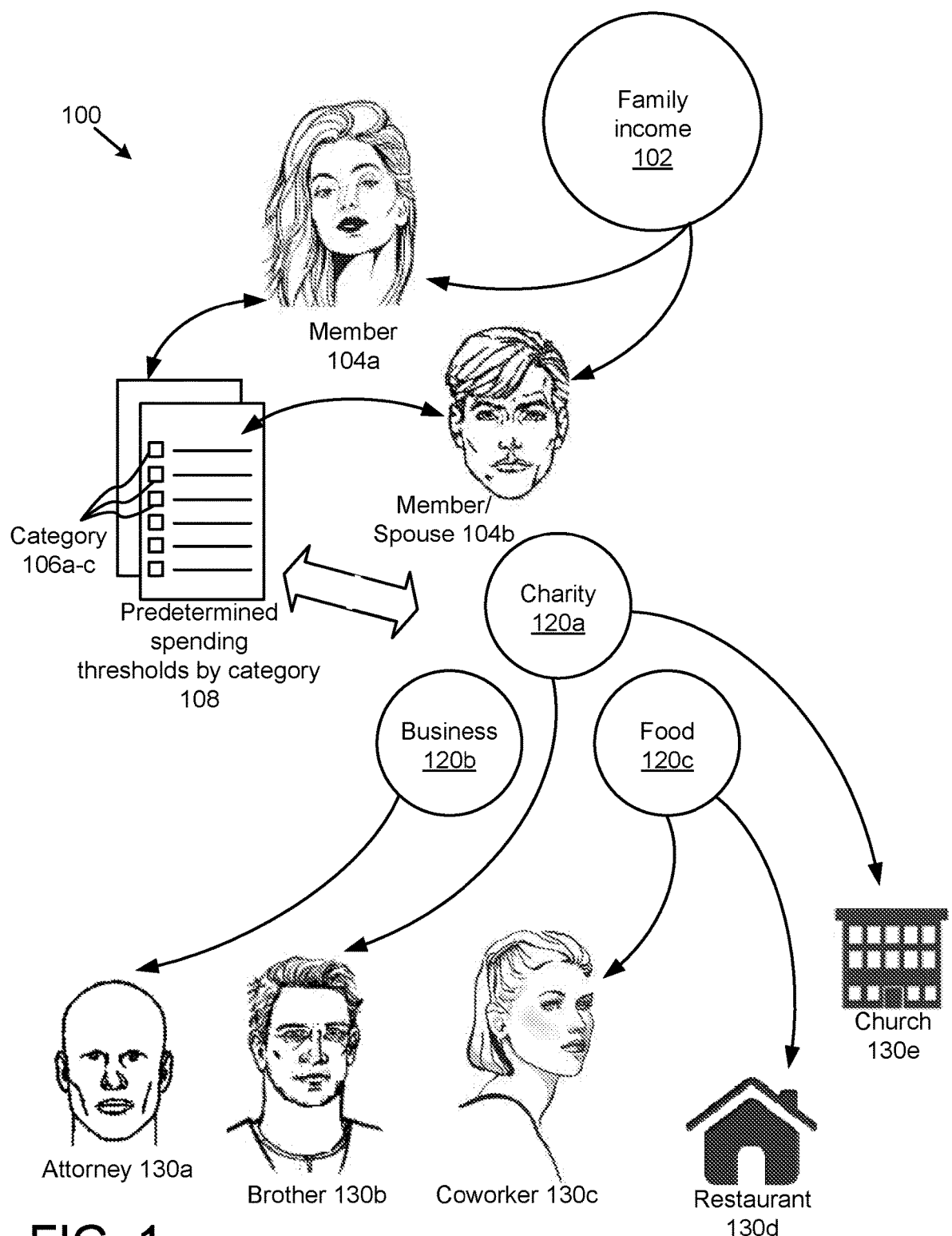
FIG. 1 is an entity-relationship diagram illustrating the relationship between inter alia members and vendors in accordance with an embodiment of the present invention.

FIG. 1 is an entity-relationship diagram illustrating the relationship 100 between shoppers, merchants and cost controls in accordance with an embodiment of the present invention.

Individuals or entities spending money in an economic system, including members who have registered with a computer program product, may comprise parents, spouses 104b, businesses, travelers, municipalities, and the like.

The members 104 derive income 102 from means known to those of skill in the art, including salaries, boni, derivatives, sales, grants, 1099 income, allowances, W-2 income, taxes and the like. The total revenues or money that a member 104 receives from all sources over a predetermined interval, which interval is a month in most embodiments, is hereinafter the "funds" or "monthly income."

In various embodiments, the funds comprises revenue generating by a plurality a members 104, including spouses, family units, or other social structures or social organizations of individuals, including church members, pupils in a particular school or grade, members of a governmental entity, or a business seeking to control employee spending.

In the shown embodiment, member 104a and member's 104a spouse 104b both make use of a computer program product for virtual budgeting, or alternatively a method or system. One or both of the members 104 selects or otherwise identifies a plurality of categories 106 or (spending categories 106) into which each of a plurality of future expenditures will be categorized.

These categories 106 may be predefined and selected from a list, or may be defined by the members 104. Non-exhaustive examples of categories 106 include food, travel, office, personal, utilities, and miscellaneous.

In various embodiments, subclasses within each class are defined by the member 104 or alternatively defined by merchants 120 or vendors 120 interfacing with a system, computer program product 100, or method. Examples of subclasses may include food, housing, electronics, books, gifts, digital media, guns, lodging, office supplies, legal services, medical services, insurance, construction contractors, or the like.

The members 104 work together, or alone, to define spending budgets for each category 106. A list 108 of predetermined spending thresholds is created by the members 104, which includes a separate predetermined spending threshold exclusively associated with each category.

Like the members 104, the merchants 120 may comprise any person, company or organization that is potentially a merchant of another person, company or organization.

All future expenditures, including bank transfers, credit card payments, and debit card payments, made by any member 104 are categorized into one of the categories 106 before the expenditure is authorized at a point of sale terminal, on a merchant account, or the like.

In the shown embodiment, members 104 are making (or attempting to make) payments to a charity 120*a*, legal services 120*b*, and food 120*c* using a credit card or debit card. The computer program product may act as the authorizing bank in some embodiments, authorizing the payments to the charity 120*a*, legal service provider 120*b*, and restaurant (e.g. food 120*c*) only if those payments when added to previously payments made within a single category 106 (over a predetermined interval) fall below the predetermined threshold for that category 106. In the preferred embodiment, however, the computer program product simply allocates virtual currency from the balance of a general account to virtual accounts exclusively associated with each category. Real currency is not transferred with any banking institutions, rather accounting is handled between virtual accounts.

The fees for legal services may include fees paid to an attorney 130*a*. Fees for charity 120*a* may include gifts to family members such as a brother 130*b* or church 130*e*, and fees for food 120*c* may include a lunch purchase for a coworker 130*c*, a payment to restaurant 130.

The charity 120*a*, business 120*b*, and food 120*c* are classes/categories 106 named and identified by a member 104. Each of these categories 120 may comprise subclasses or subcategories, for instance the charity 120*a* class may comprise: church, the homeless shelter, a university, and the like.

Figure 2:
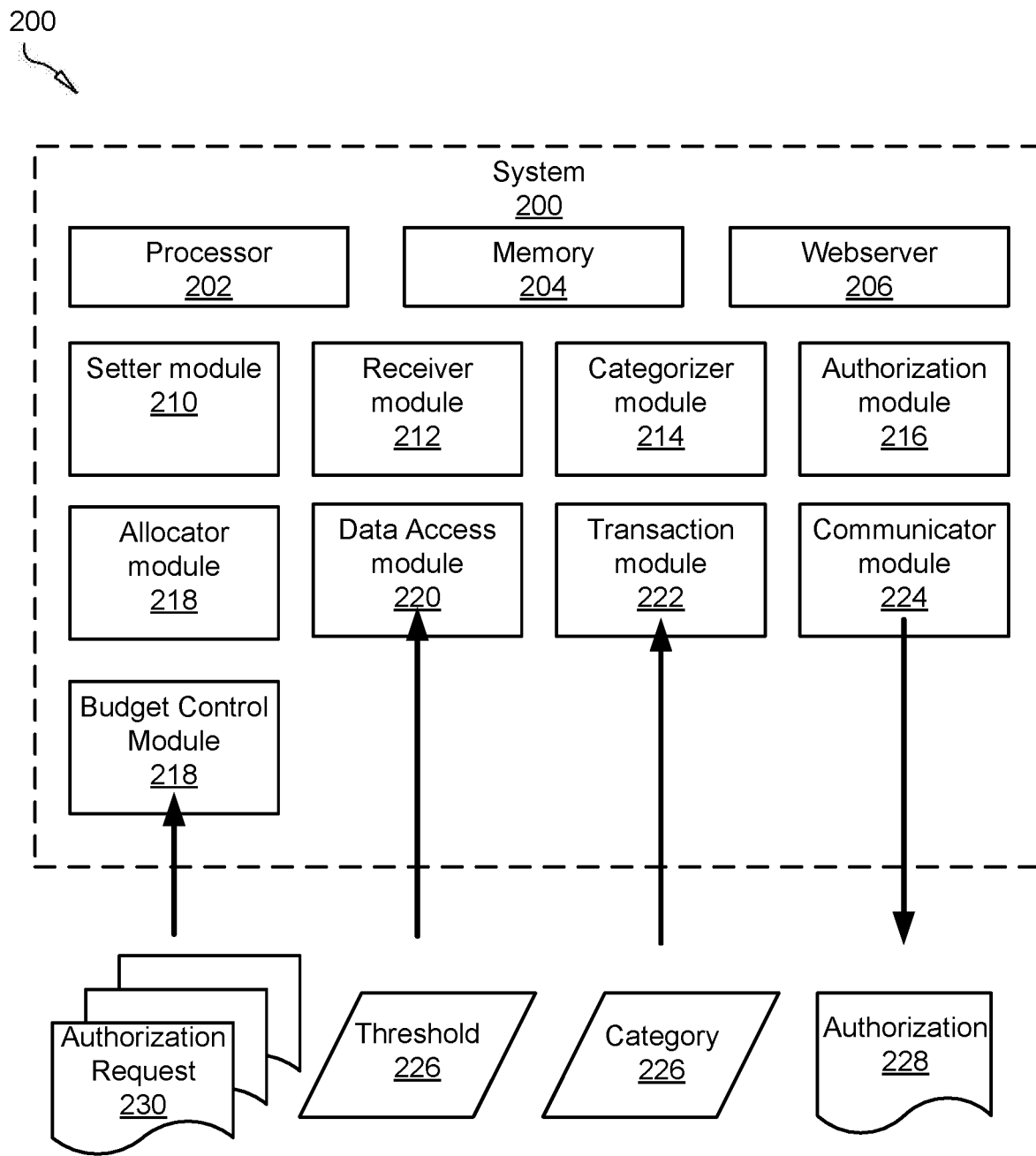
FIG. 2 is a block diagram illustrating the modules of a system for virtual budgeting in accordance with the present invention.

FIG. 2 is a block diagram illustrating the modules of a system for virtual budgeting in accordance with the present invention. The system 400 comprises a process 202, memory 204, a webserver 206, a setter module 210, a receiver module 212, a categorizer 214, an authorization module 216, a budget control module 218, a data access module 220, a transaction module 222, a communicator module 224, an authorization request 230, a threshold 226, a category 226, and an authorization 228.

The modules may be distributed over a computer network. The computer network can include one or more processors, indicated generally. Additionally, the computer network can include a computer readable memory, indicated generally, that is accessible by the one or more processors, the computer readable memory storing programming instructions for a virtual budgeting system. The programming instructions can implement the methods shown.

Additionally, the processors and computer readable memory can connect to a remote server, indicated generally, via a wireless access point. The remote server can contain data that either stores or processes the data to be used on a mobile handheld wireless computing device, indicated generally, for sending and receiving content to the virtual marketplace. The mobile handheld wireless computing device can include a mobile phone, a cellular phone, a satellite phone, a mobile handheld electronic organizer, a mobile electronic tablet, a laptop computer, any other internet-connected personal electronic device, and the like.

The setter module 210 may be configured to set a category and/or a predetermined threshold for each category. In various embodiments, the setter module 210 interfaces via a wide area network (WAN) with a browser on a tablet computer of a member 104 prompts the member 104 to textually enter a class name of a class 106. This class name is stored in computer-readable DBMS memory (database management system) and exclusively associated with an integer representing a spending threshold amount in dollars for said class 106 which cannot be exceeded by the members whose income forms the funds.

The receiver module 212 may receive an authorization request 230 from a third-party merchant. In various embodiments, a system 200 or computer program product 100 electronically approves merchant transaction requests from merchants or vendor 120. The computer program product 100 or system 200 acts for, or in place of, a merchant processor or originating bank in a credit card transaction.

In various embodiments, the funds are pooled in a general funds of the merchant processor under the control of the system 200 along with funds from other members 104 or groups of members 104. The merchant processor is known to those of skill in the art, and may comprise a processor such as Elavon®, PayPal®, or the like.

The categorizer module 214 may categorize authorization requests into one of the categories 106 chosen by a user or predetermined by a computer program product. The categorizer module 214 may also classify authorization requests into one of a plurality of subcategories which may be designated by a user 104, selected by the technology provider, or designated by the merchant requesting an authorization.

The authorization module 216 is configured to simply activate, or deactivate, a credit card under the control of a user 104, using means known to those of skill in the art.

The allocator module 218 may allocate money received at the beginning of a predetermined term from a user 104 into a general account across a plurality of sub-accounts, each sub-account being exclusively associated with a category 106. The sum of all category 106 authorizations may not exceed the amount of the funds existing in the general account at the beginning of the predetermined term.

Figure 3A:
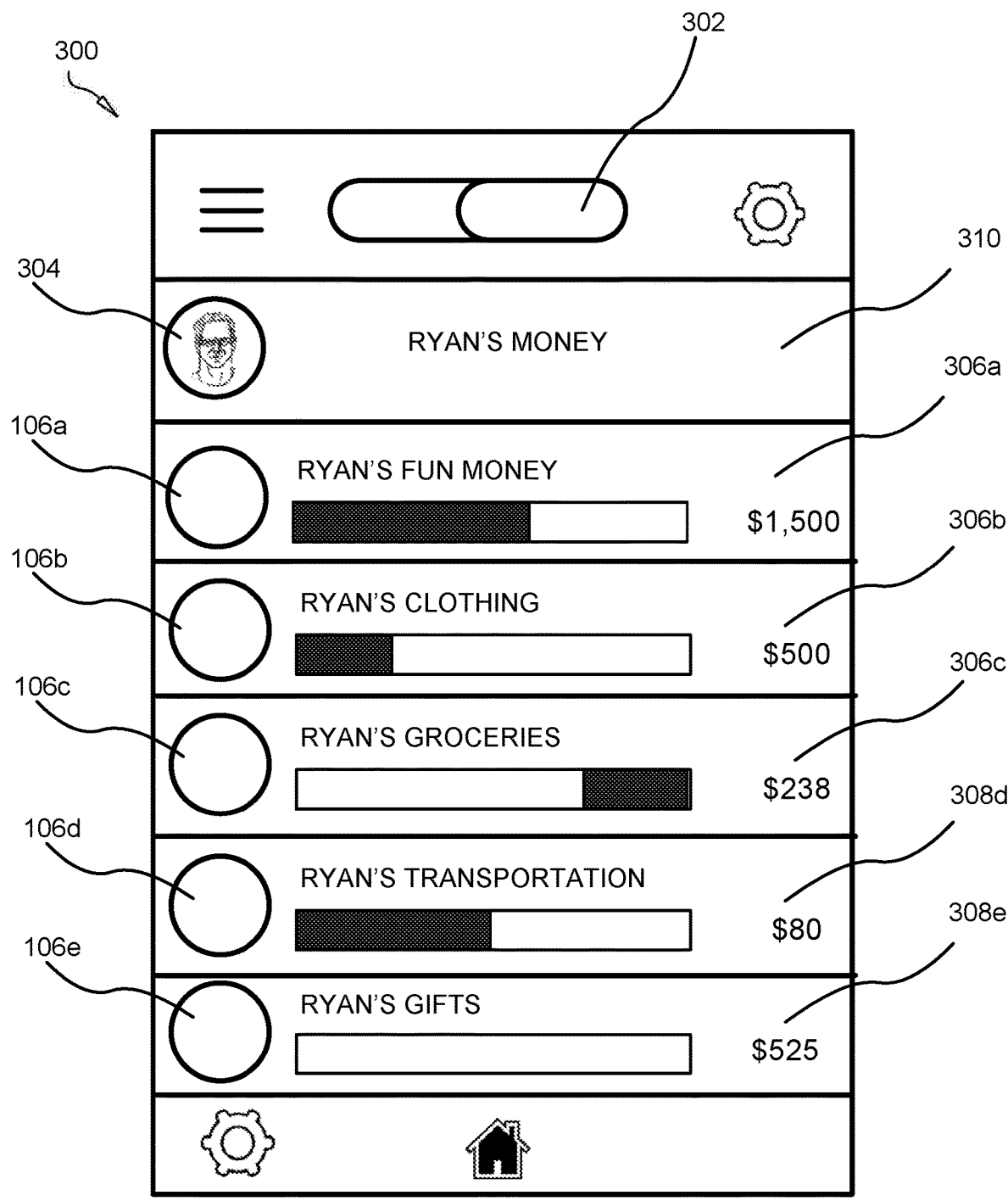
FIG. 3A depicts the display and virtual controls of a computer application in accordance with the present invention.

FIG. 3A depicts the virtual controls of a computer application in accordance with the present invention.

A computer program product may be designed to implement the steps of the methods or systems taught herein. This computer program product may run as an application or "app" on a mobile phone or tablet computer.

The computer program product may prompt a user to enter a PIN for access to the program, then may show the categories 106 of expenditures chosen by the categorizer module 214.

In various embodiments of the present invention, members 104 are required to make expenditures or purchases using a card at a point of sale terminal at merchant 120 locations. It is one object of the present invention to provide a system 200 which is configured to automatically reject purchase attempts by a consumers/members 104 in which a purchase authorization request does not contain a class 106. In short, unless the member 104 categorizes a purchase before making said purchase, into a class 106, the purchase authorization will be declined.

In various embodiments, the money allocated to each class 106 is zero. Members 104 are required to move money digitally using a browser on a tablet computer from a general account to an account for the class 106 in which the member 104 wishes to make a purchase. This transfer must be made by the member 104 within a predetermined period before the purchase, usually only a few minutes or an hour, before the system 200 automatically transfers the money allocated to the class 106 back to the general fund.

In configuring the system 200 in this fashion, an emotional impediment is created for the member 104 before purchasing. The member 104 may allocate funds for each purchase made, and must identify a class 106 for each purchase made, all before the purchase is realized.

These aggregated payments authorized by categories 106 may be shown is a line graph, pie graph or other graphical representation, as well as the amount still available under budget for each category 106, all over a predetermined interval such as a week, month or year.

As shown in FIG. 3A, each class 106 may be itemized in a browser of a member 104, which browser is interfacing with a central server forming part of the system 200. The name selected by the member 104 for each class 106 is displayed with an icon representing the class 106, along with a bar graph displaying expenditures to date during the predetermined interval (usually a month) in connection with each class 106.

The total expenditures 306 for each class are also shown.

Figure 3B:
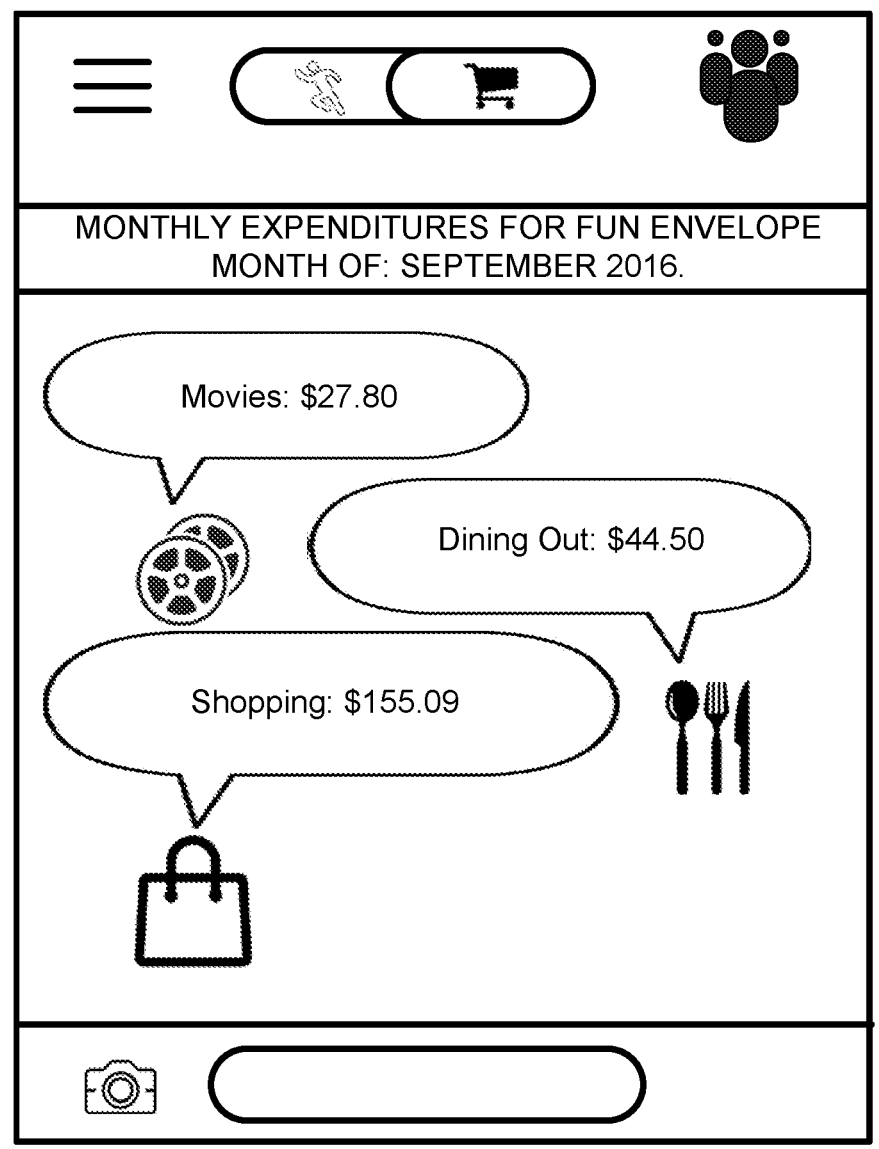
FIG. 3B depicts the display and virtual controls of a computer application in accordance with the present invention.

FIG. 3B depicts the display and virtual controls of a computer application in accordance with the present invention.

Total expenditures for each class 106 are displayed graphically in an exemplary embodiment of a browser. The classes 106 are represented by icons and identified by name.

Figure 3C:
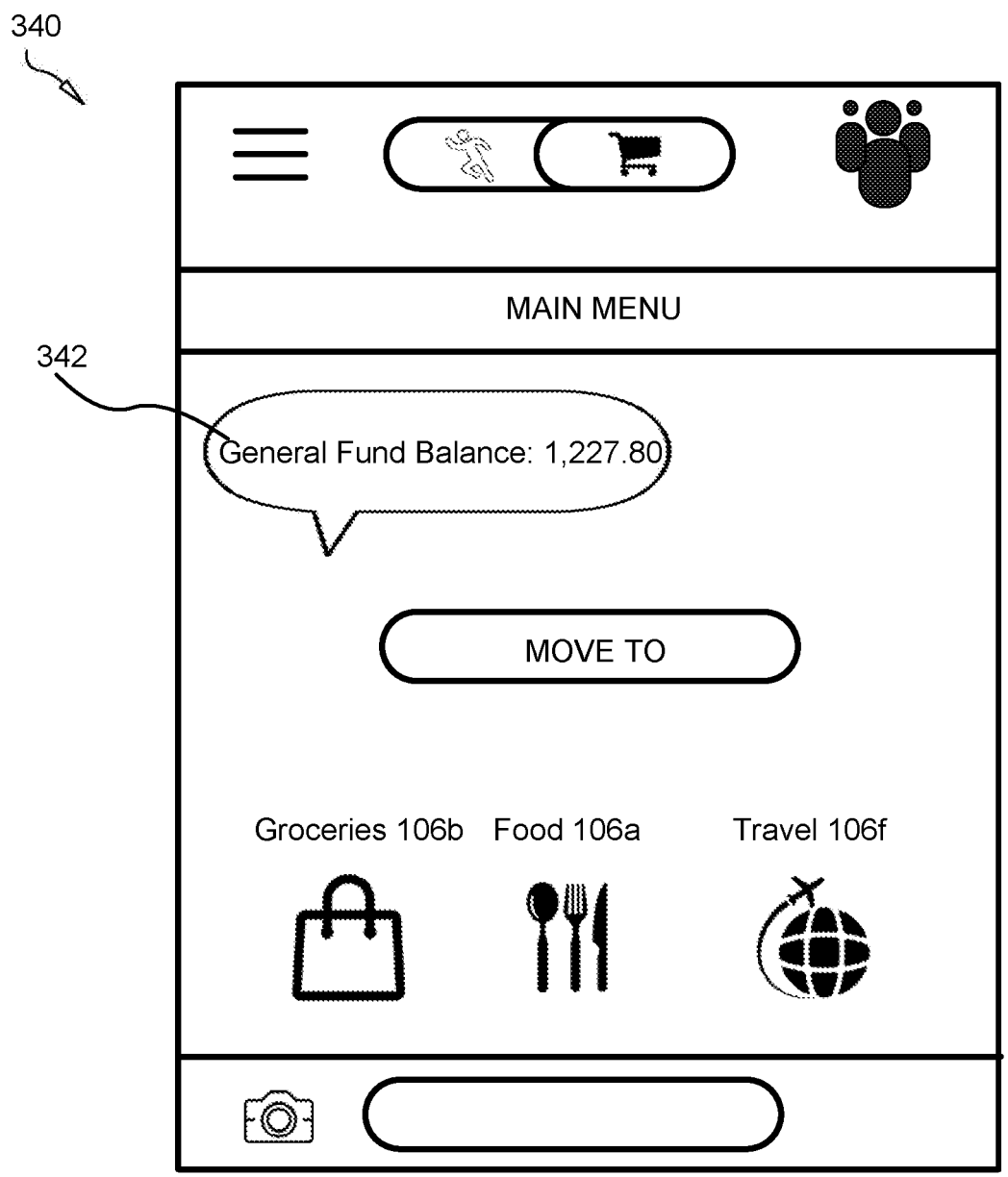
FIG. 3C depicts the display and virtual controls for allocating money of a computer application in accordance with the present invention.

FIG. 3C depicts the display and virtual controls for allocating money of a computer application in accordance with the present invention.

As shown, a general fund balance of $1,227.80 is shown and virtual controls are provided enabling a member 104 to allocate money from the general account 142 to the classes 106b, 106a, 106f.

Figure 4:
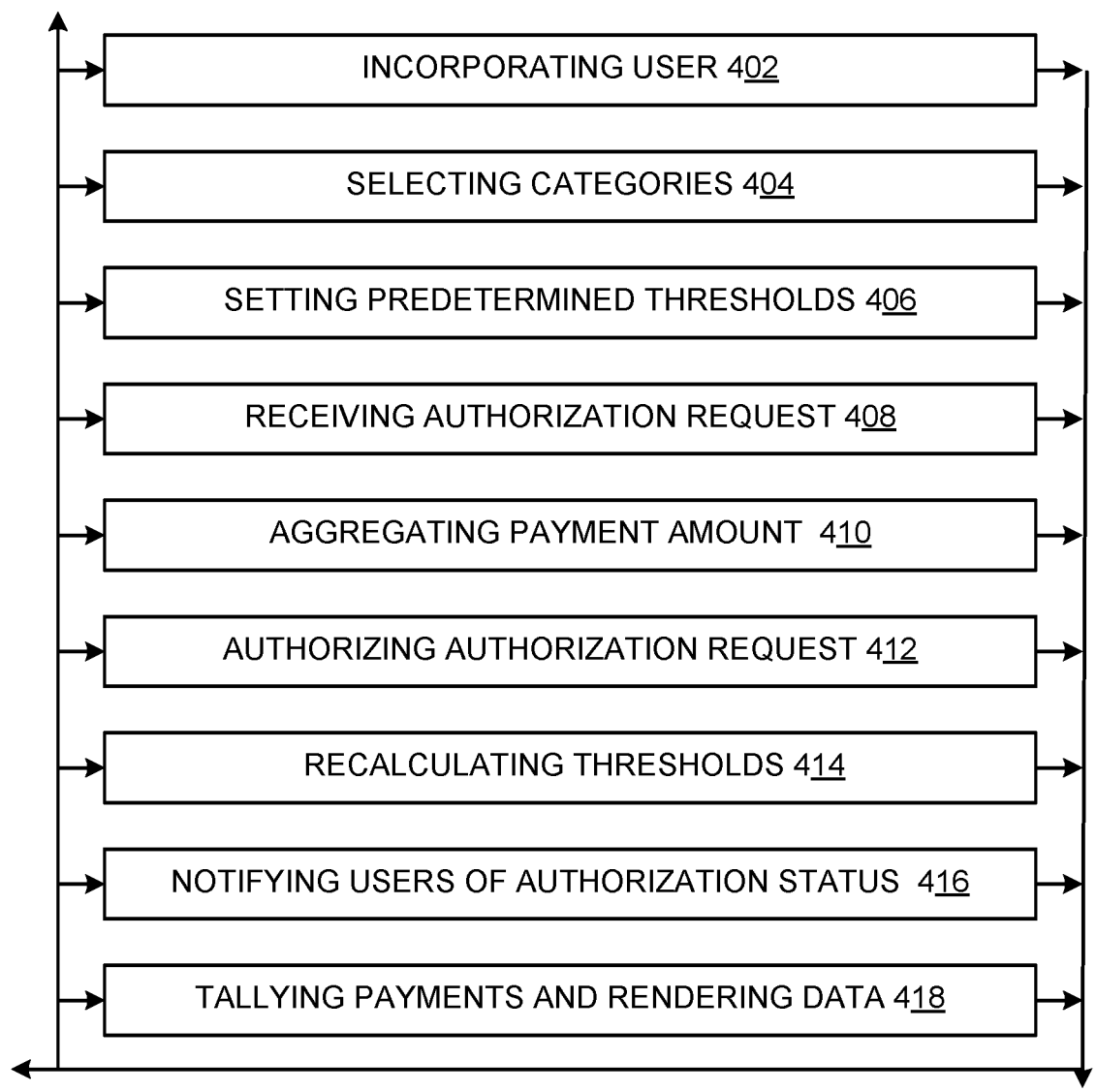
FIG. 4 is a flow chart showing the steps of a method of virtually budgeting funds in accordance with the present invention.

FIG. 4 is a flow chart showing the steps of a method 400 of virtually budgeting funds in accordance with the present invention.

Users, including members 104, may be incorporated 402 into a system 200 or computer program product. These users or members 104 may select 404 categories 106, and set 406 predetermined thresholds for those categories 106.

Members 104 become incorporated when they create accounts with the server by uploading personal identifying information, including one or more of address, email address, telephone number, purchasing practices, and the like. In typical embodiments, the registration takes place via a browser, but may also be sent to the server using programs well-known to those of skill in the art, such Microsoft Outlook, Thunderbird, Yahoo! Mail, and the like.

The system 900 comprises one server 902, a database management system (DBMS) 904, persistent storage 906, stored consumer requests 908, stored historical data 110, a wireless network 912, a consumer 918, providers 914a-b, a computer 918b, a merchant processor 919, a consumer request 920, and payment data 922.

Typically, the server comprises one or more central processing units executing software and/or firmware to control and manage the other components within the system. In one embodiment, the server comprises hardware and/or software more commonly referred to as a Multiple Virtual Storage (MVS), OS/390, zSeries/Operating System (z/OS), UNIX, Linux, or Windows system.

The server may comprise a server cluster with firewalls, load balancer, and database servers having Apache® and/or other software applications well-known to those of skill in the art. The server, in the shown embodiment, comprises a database management system (DBMS) or relational database management system (RDBMS), such as Oracle, MySQL, SQL, FireBird, IBM DB2®, or the like.

Authorization requests 130 are received 408 by the receiver module 212. These authorization requests 130 are authorized or denied by the authorization module 216.

Expenditures in each class 106 are aggregated 410 and new authorization requests which exceed the predetermined threshold for said class 106.

In various embodiments, at the end of a predetermined period, if there is a remaining balance in the general fund 342, the predetermined thresholds or predetermined spending thresholds for each class 106 may be automatically adjusted in accordance with a remainder adjustment criteria. In some embodiments, remaining revenue is rolled over into a subsequent month, into a savings account, or in other embodiments the remaining revenue is divided and allocated pro rata based on the original thresholds over the classes 106.

The predetermined thresholds may be recalculated 414 to show the available credit, balance, or credit for each category 106.

Figure 5:
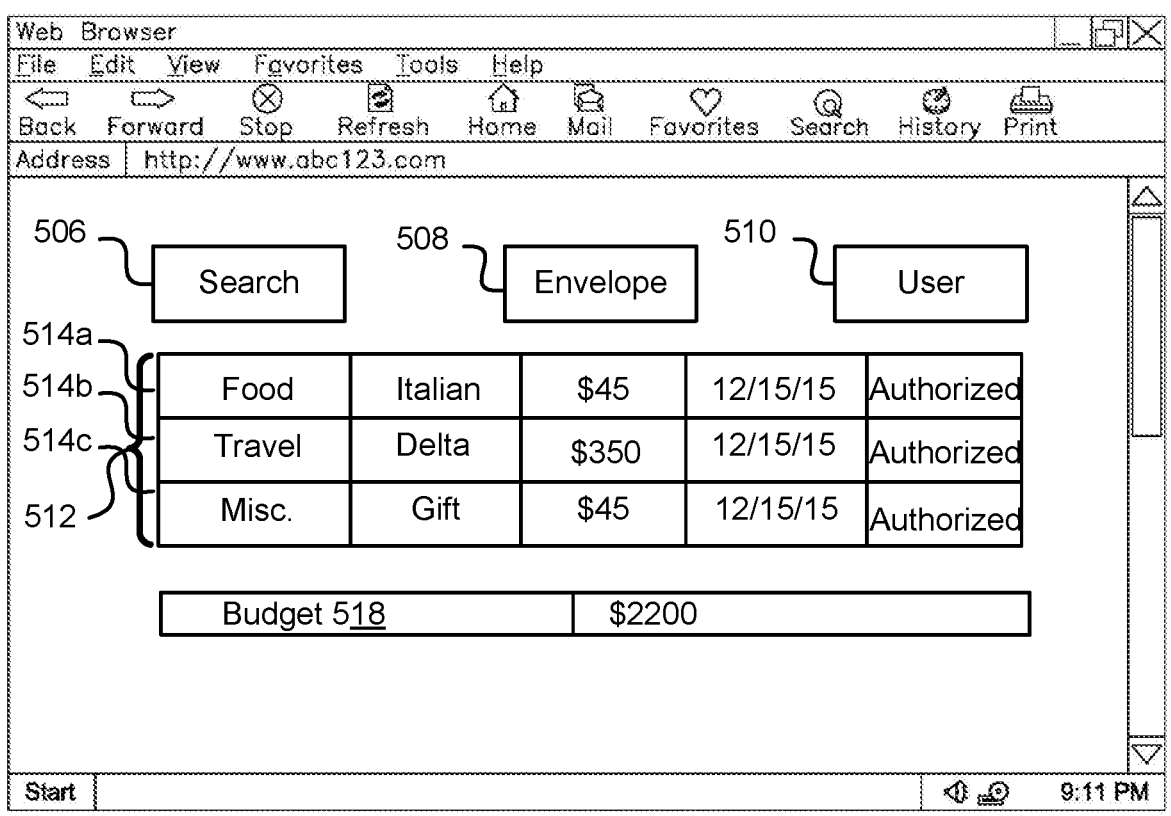
FIG. 5 illustrates a browser with virtual controls for virtually budgeting funds in accordance with the present invention.

FIG. 5 illustrates a browser with virtual controls for virtually budgeting funds in accordance with the present invention. The shown embodiment illustrates, more specifically, historical data associated with three categories 106. The shown categories 106 in this instance consists of a food 514a, travel 514b, and misc. 514c. Each of these categories 514-ac shown a subcategory into which an expense was previously classified. In this instance "Italian" is the subcategory of food 514a showing a payment of $45 dollars on the specified date of Dec. 15, 2015. This payment was authorized.

Virtual controls 506-512 are shown on a web browser in accordance with the present invention. The display and virtual controls may comprise a search button, categories 106, authorization request stati, and the like. These virtual controls allow a user/member 104 to view historical data.

Payments by category 106 may be shown in the browser as shown, with payment authorized shown in matrix fashion.

Figure 6:
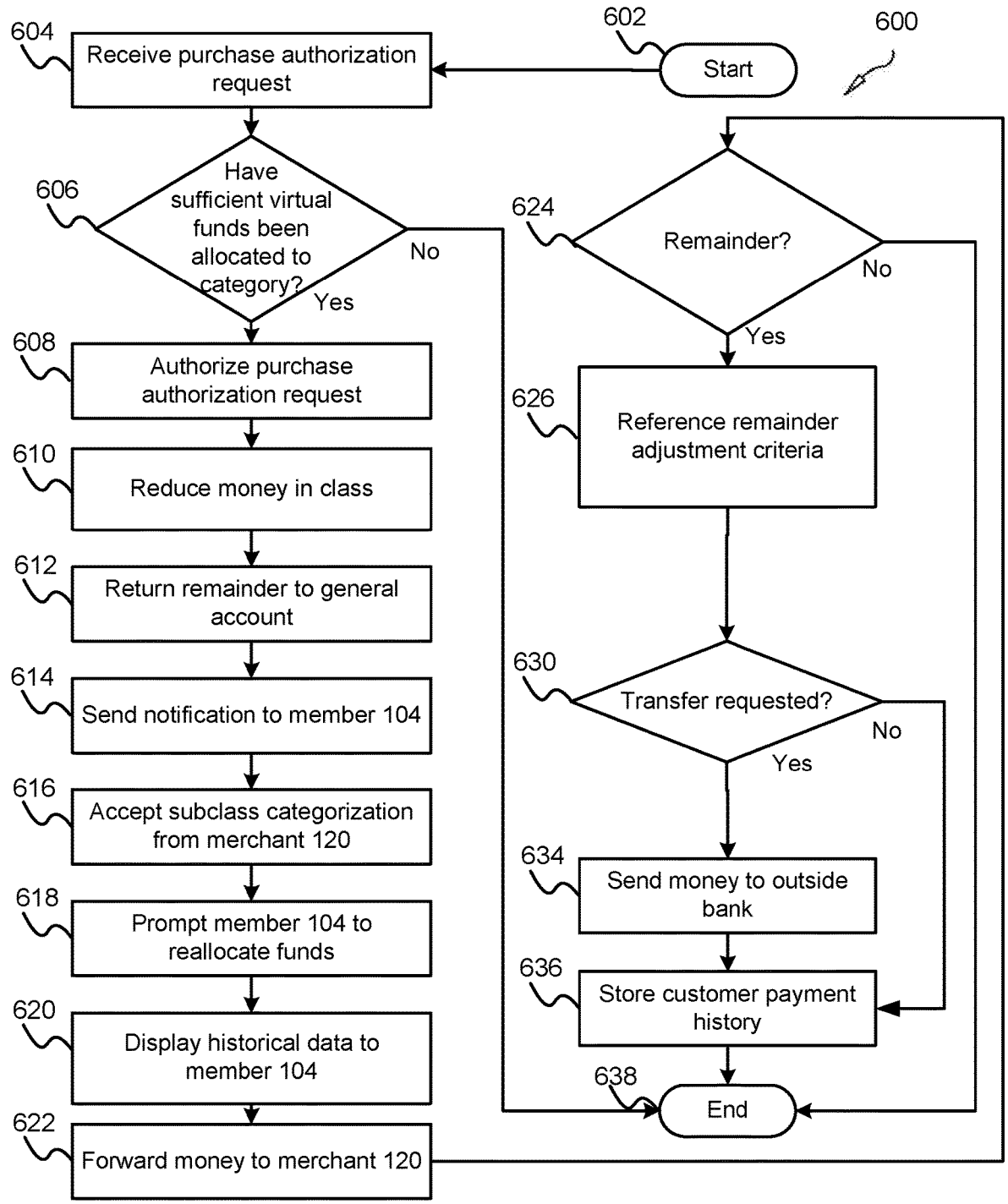
FIG. 6 is a flow chart showing the steps of a method of virtually budgeting funds in accordance with the present invention.

FIG. 6 is a flow chart showing the steps of a method 600 of virtually budgeting funds in accordance with the present invention.

The method begins 602 when a purchase authorization request is received 604. This request may be received from a merchant; or, in alternative embodiments, a credit and/or debit card is simply authorized, activated or deactivated in place of step 604. For the purposes of this disclosure, the terms "credit card" and "debit card" are used synonymously.

A check is performed 606 to determine with sufficient funds have been allocated to a category 106 within the purchase described in the request is classified or categorized. If proper funds have been allocated, the request is authorized 608 and the money allocated to the category 106 debited for the purchase amount. Unused funds associated with the category 106 may be automatically returned 612 or reallocated to a general account under the control of the technology provider.

The member 104 receives 614 a notification from the technology provider, and may be prompted to accept 616 a subclass into which the request will be classified. The member 104 is then prompted by the computer program product and/or technology provider to reallocate 618 funds for another purchase.

Historical data may be displayed 620 and money forwarded to a merchant 622 in some embodiments, though not in others.

If, at the end of the predefined terms, which is usually a month, money remains 624 in the general account exclusively associated with a member 104, the technology provider may allocate this money in accordance with a remainder adjustment criteria, including remitting the money to a savings account, 401(k), mutual fund, checking account, the IRS, or the like.

If a transfer is requested 630 by the user 104, the remaining funds may be sent 634 to an outside bank and the transaction recorded or stored 636 in computer-readable memory before the method 600 ends 638.

Figure 7:
FIG. 7 illustrates a computer-readable DBMS file showing historical data of virtually-budgeted funds in accordance with the present invention.

FIG. 7 illustrates a computer-readable DBMS file 700 comprising historical data of virtually-budgeted funds in accordance with the present invention.

The computer file 700 comprises a packet for Ryan's money 310, which packet 310 comprises categories 106, expenses associated with those categories 106, and transaction data for each expense, 308, 704, 706, 708. This transaction data may comprise a charge amount, a date of a purchase, a description of the purchase or merchant, and vendor or merchant name.

Figure 8A:
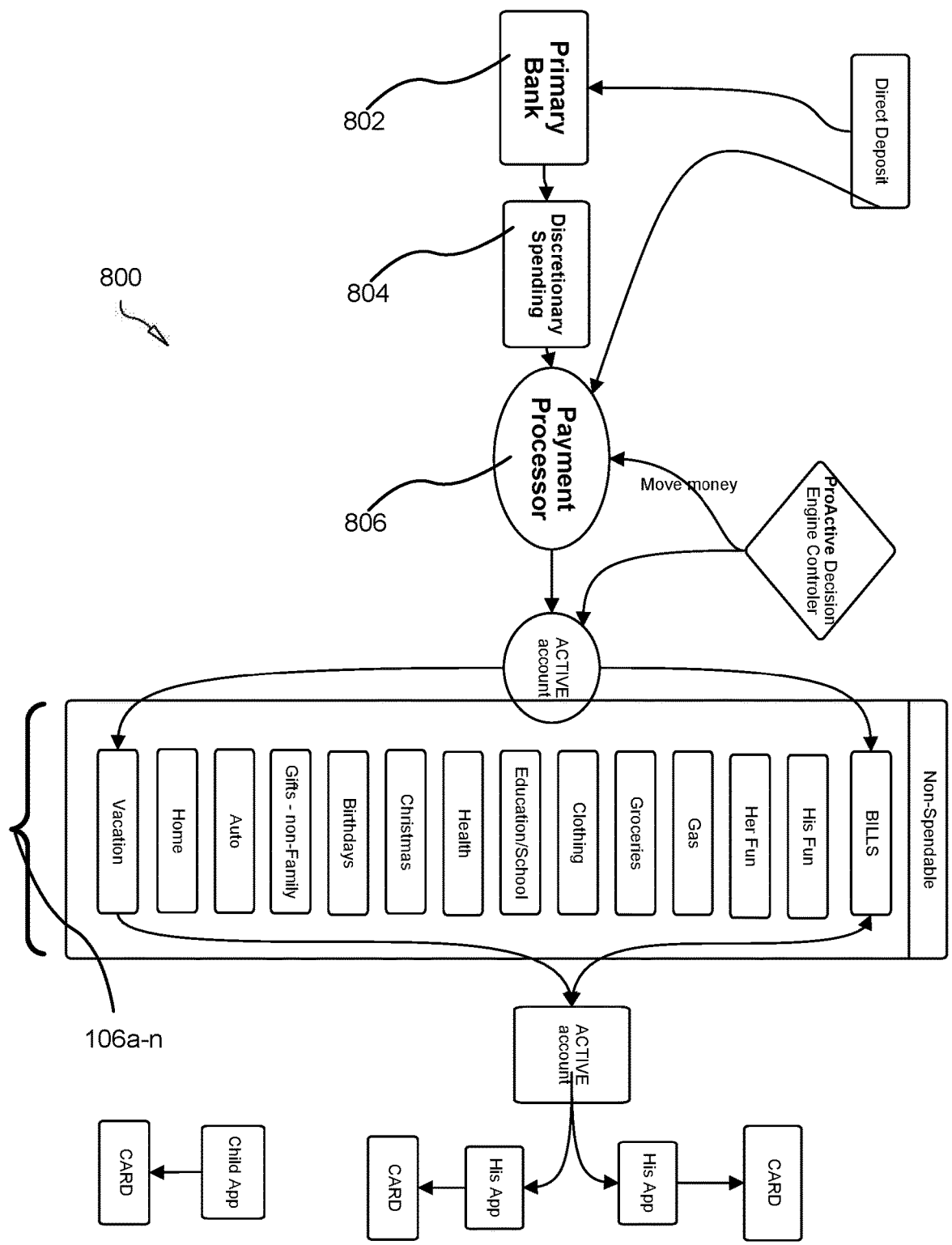
FIG. 8A is an entity-relationship diagram illustrating the relationship between system entities in accordance with an embodiment of the present invention.

FIG. 8A is an entity-relationship diagram illustrating the relationship between system entities in accordance with an embodiment of the present invention.

Money is direct deposited into a primary bank 802. A portion of this money consisting of the discretionary spending portion 804 is transferred to a payment processor 806. This money may be allocated over a plurality of categories 106a-n which are shown.

If an account for a particular user 104 is active, a credit card is activated for a user 104; or, in some cases, the family member of a user 104, including a child.

Figure 8B:
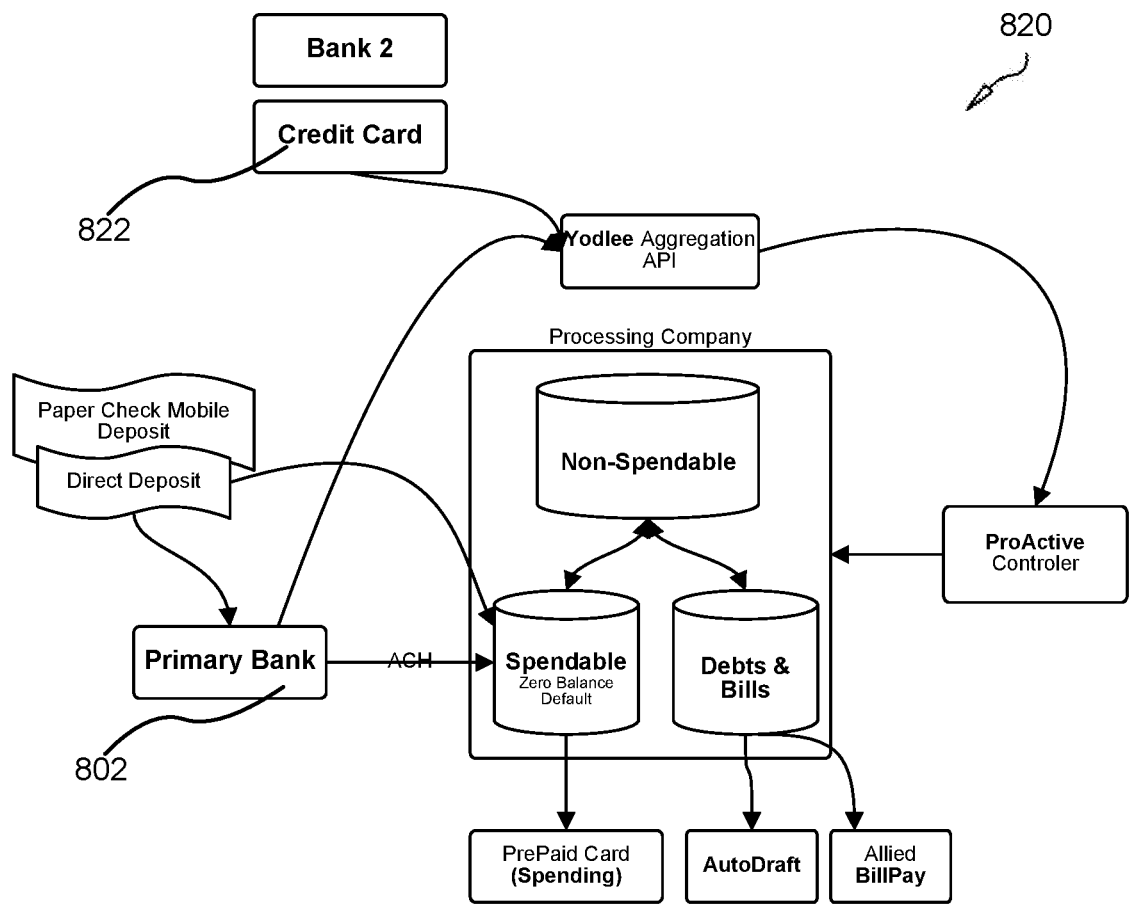
FIG. 8B is an entity-relationship diagram illustrating the relationship between system entities in accordance with an embodiment of the present invention.

FIG. 8B is an entity-relationship diagram illustrating the relationship between system entities in accordance with an embodiment of the present invention.

A credit card 822 may be activated in response to money being deposited with the primary bank 802, which money may be allocated as spendable, non-spendable, and fixed (or debts & bills as shown). The technology provider may remit funds to third-parties for the fixed portions of the money, and may remit funds to a non-spendable account such as 401(k) in accordance with a predetermined remittance criteria. Any funds remaining are classified as spendable and used, in some embodiments, to activate a prepaid credit card.

Figure 8C:
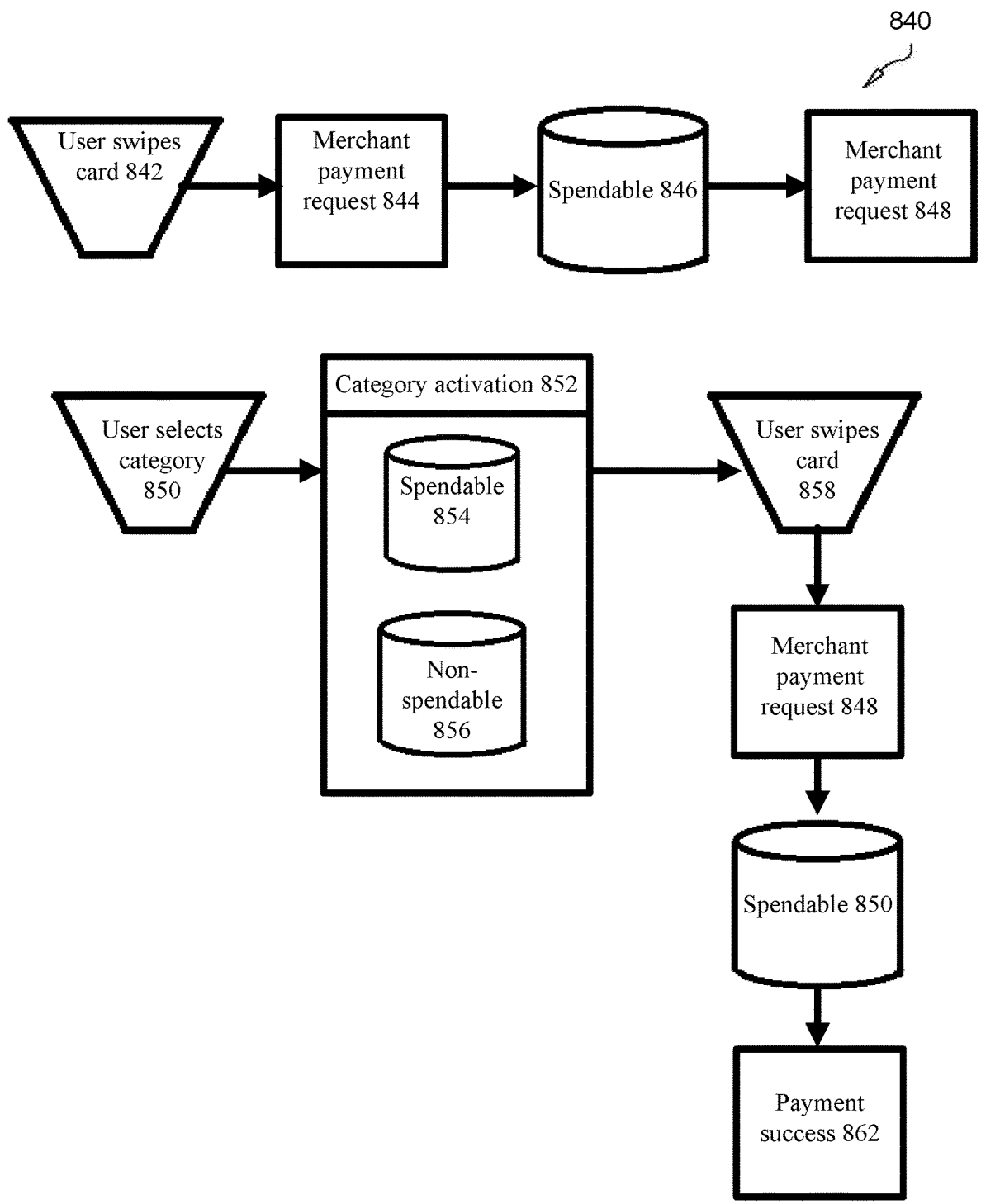
FIG. 8C is a flow chart illustrating a dual account method for controlling related expenditures collectively exceeding a predetermined threshold in accordance with an embodiment of the present invention.

FIG. 8C is a flow chart illustrating a dual account method 840 for controlling related expenditures collectively exceeding a predetermined threshold in accordance with an embodiment of the present invention.

A user 104 swipes 842 a credit card 822 initiating 844 a merchant payment request with is stored 846 in computer-readable memory. A user 104 also selects 850 a category 106. The user 104 may designate the category 106 as spendable 854 or non-spendable 856. The user 104 may allocate funds to spendable accounts 854.

Figure 8D:
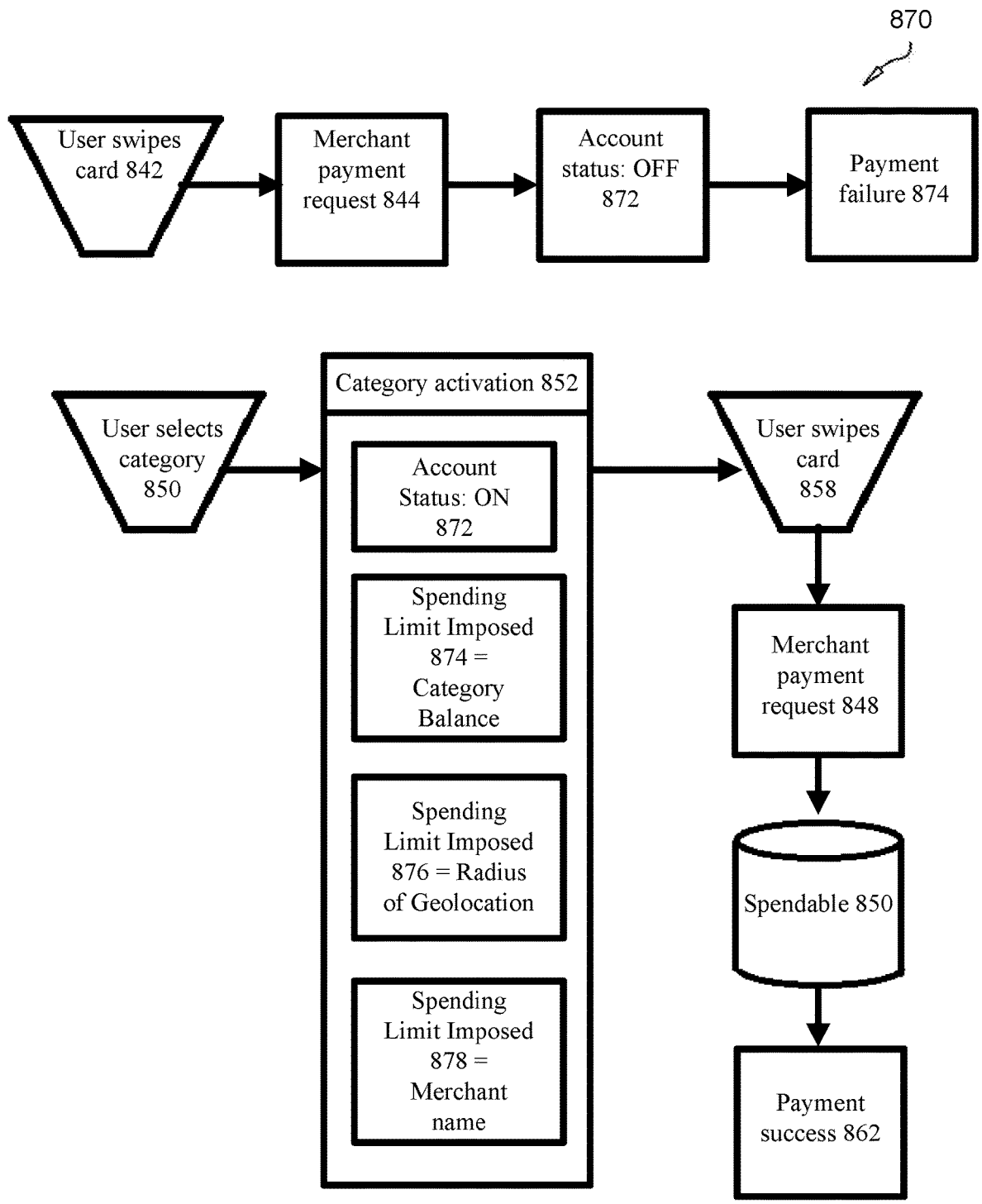
FIG. 8D is a flow chart illustrating a single account method for controlling related expenditures collectively exceeding a predetermined threshold in accordance with an embodiment of the present invention.

FIG. 8D is a flow chart illustrating a single account method 870 for controlling related expenditures collectively exceeding a predetermined threshold in accordance with an embodiment of the present invention.

In the method 870, an account status 872 may be turned to, or designated, as OFF. This causes all attempts by a user 104 to authorize a credit card 822 to fail 874. The account status may be Boolean variable in computer-readable memory evaluated as true for an account with an ON status and as false for an account with an OFF status. The account status may also comprise any other data type known to those of skill in the art.

In the shown embodiment, when a user 104 designates a category 106 as spendable 854, the account status 872 for the designated category 106 is turned to ON. The user 104 also has the option, or is prompted to, identify or designate in some embodiments a spending limit 874 for this category which is equal to or less than a category balance in a general account exclusively associated with the user 104.

The user 104 may additionally or alternatively designate a spending limit 876 which is geographic in scope and which prevents ependitures in said category 106 outside of a preset radius from a center point. The center point may be a user's 104 residence or present location, and may be expressed in global positioning system (GPS) coordinates as known to those of skill in the art.

Additionally or alternatively, the user 104 may designate a spending limit 878 which prevents expenditures at merchants non on a preapproved list of qualifying merchants. This list may be stored in computer-readable memory under a DBMS and the merchants may be designated by name, address, or a unique identifier.

It is an object of the present invention to set forth two approaches in which a purchase may be approved which is initiated by a user 104: (1) the first is by moving funds temporarily into a subaccount exclusively associated with a category 106, then moving those funds out and reducing the balance to zero after a predetermined interval has expired; and (2) instructing a bank to activate or deactivate a credit card.

In accordance with the first of these approaches, the balance of the subaccount is kept at zero except for the those temporary intervals of time in which funds are placed in it before being spent or reverting back to the general account originating the funds.

In accordance with the second of these approaches, the credit card is defaulted to an inactive, or deactivated, status (or OFF status 872). The credit card is only activated for a predetermined intervals of time sufficient to allow a user to make an authorized purchase, and even then the purchase is subject to limitations described above, including geographic limitations and/or merchant name limitations and/or price limitations.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product in computer readable memory comprising instruction relayable on a signal bearing medium for controlling related expenditures collectively exceeding a predetermined threshold, the operations of the computer program product comprising:

receiving from a user at a server comprising one or more central processing units a predetermined spending threshold for at least one of a plurality of categories, the predetermined spending threshold being indicative of a dollar amount;

receiving from the user at the server a payment authorization request for an intended transaction comprising one or more expenditures, the payment authorization request comprising:
    an amount of the intended transaction; and
    a category from the plurality of categories in which to categorize the intended transaction including each of the one or more expenditures;

in response to receipt of the payment authorization request from the user, temporarily activating a debit card under control of the user and allocating transaction funds from a general account to a category account associated with the payment authorization request allocating funds to a debit card under the control of the user for a predetermined interval of time comprising no more than one hour, wherein the debit card defaults to at least one of an inactive status and a zero balance other than during the predetermined interval of time, wherein the debit card declines any and all payment authorization requests unless the user has provided a category for the intended transaction, and wherein the debit card only allocates funds to the debit card temporarily upon accepting a payment authorization request comprising a category for the intended transaction;

reallocating the funds from the category account to the general account after expiration of a predetermined term and deactivating the debit card under the control of the user;

receiving from the user at the server a second payment authorization request for a second intended transaction comprising one or more expenditures, the second payment authorization request lacking an accompanying category for the second intended transaction; and at least one of refusing to allocate funds to the debit card for the second intended transaction and reallocating transaction funds such that the second intended transaction is denied.

2. The computer program product of claim 1, further comprising activating the debit card under the control of the user in response to a geostatic location of the user coinciding with a geostatic location of an approved merchant through reference to an approved merchant list.

3. The computer program product of claim 1, further comprising maintaining a zero balance in the category account except for during the predetermined interval of time.

4. The computer program product of claim 1, further comprising receiving from the user at least one of a number associated with each of the plurality of categories and a name for each of the plurality of categories.

5. The computer program product of claim 1, further comprising:
    aggregating the payment authorization request with previously authorized payments over a predefined interval within the category to produce a category sum;
    relaying the aggregating category sum to the user; and
    displaying the category sums for each category on a portable GUI.

6. The computer program product of claim 1, wherein the payment authorization request comprises a user name and an account number.

7. A computer-implemented method for controlling related expenditures exceeding a predetermined threshold, the steps of the method comprising:
    receiving from a user at a server comprising one or more central processing units a predetermined spending threshold for at least one of a plurality of categories;
    wherein a sum of all predetermined spending thresholds is less than a dollar balance in a general account of the user;
    receiving a payment authorization request from the user, wherein the payment authorization request comprises an amount of an intended transaction; and a category from the plurality of categories in which to categorize an intended purchase, wherein the category is entered on a mobile application or a web-based application under the control of the user, and wherein the payment authorization request is received from the mobile application or the web-based application;
    in response to receipt of the payment authorization request comprising the category from the user, temporarily activating a debit card under the control of the user and allocating transaction funds from the general account to a category account associated with the payment authorization request for a predetermined period of time of no more than one hour, wherein the debit card automatically defaults to at least one of a zero balance and an inactive status following the predetermined period of time, and wherein the debit card automatically rejects purchase attempts lacking a category;
    receiving from the user at the server a second payment authorization request, wherein the second payment authorization request lacks a category associated with an intended purchase; and
    in response to receipt of the second payment authorization request lacking a category from the user, at least one of refusing to allocate transaction funds to the debit card and reallocating transaction funds to prevent the debit card from completing a purchase associated with the second payment authorization request.

8. The computer-implemented method of claim 7, further comprising receiving a name for each of the plurality of categories from the user.

9. The computer-implemented method of claim 7, wherein the payment authorization request comprises a virtual account number exclusively associated with a virtual account.

10. The computer-implemented method of claim 7, further comprising:
    deactivating the debit card in response to expiration of the predetermined time.

11. The computer-implemented method of claim 7, further comprising activating the debit card in response to a geostatic location of the user coinciding with a geostatic location of an approved merchant through reference to an approved merchant list.

12. A system for controlling expenditures exceeding a predetermined threshold, the system comprising:
    a mobile application running on a mobile handheld wireless computing device;
    a remote server comprising one or more processors;
    a computer readable memory accessible via a signal bearing medium by the one or more processors;
    an allocator module configured to allocate funds across one or more accounts;
    a setter module configured to set a predetermined spending threshold for at least one of a plurality of categories, each spending threshold associated with a category, each of the plurality of categories associated with an account of the one or more accounts;
    a receiver module configured to electronically receive a payment authorization request from a user operating the mobile application, the payment authorization request comprising a requested payment amount and a category from the plurality of categories in which to categorize an intended purchase;

a categorizer module configured to receive the category selection from the plurality of categories associated with the payment authorization request from the user and to categorize the payment authorization request into one of the plurality of categories; and an authorization module configured to at least one of temporarily activate a debit card under control of the user and temporarily allocate funds associated with the payment authorization request in response to the payment authorization request, wherein the authorization module is further configured to at least one of automatically deactivate the debit card and reallocate the funds associated with the payment authorization request following a predetermined time period of no more than one hour following receipt of the payment authorization request such that a transaction associated with the payment authorization request using the debit card is denied if not completed within the predetermined time period, and wherein the authorization module is configured to decline any and all payment authorization requests lacking a category selection such that the debit card cannot be used to complete any transactions lacking an associated payment authorization request comprising a category from the plurality of categories.

13. The system of claim 12, wherein the authorization module is further configured to deactivate the debit card in response to a merchant geolocated at geostatic location of the user failing to be listed in an approved merchant list.

* * * * *